United States Patent
Cripe

[15] 3,703,077
[45] Nov. 21, 1972

[54] VACUUM PUMPING DEVICE
[72] Inventor: Maxwell L. Cripe, South Bend, Ind.
[73] Assignee: The Bendix Corporation
[22] Filed: Nov. 23, 1970
[21] Appl. No.: 91,641

[52] U.S. Cl. ................60/51, 417/403, 91/347, 303/13, 188/170, 303/13
[51] Int. Cl. ............F03b, F01l 31/02, F16d 65/24
[58] Field of Search ........417/399, 403; 91/345, 347; 60/51, 60; 188/170

[56] References Cited

UNITED STATES PATENTS

| | | | |
|---|---|---|---|
| 3,599,761 | 8/1971 | Schultz | 188/170 |
| 2,455,628 | 12/1948 | Ulrich | 91/347 |
| 3,327,635 | 6/1967 | Sachnik | 417/399 |
| 2,898,865 | 8/1959 | Gates | 91/345 |
| 3,518,030 | 6/1970 | Klees | 417/399 |
| 2,630,102 | 3/1953 | Osburn | 91/345 |
| 3,312,147 | 4/1967 | Reichard | 60/54.6 P |

FOREIGN PATENTS OR APPLICATIONS

| 27,088 | 4/1956 | Germany |
|---|---|---|

*Primary Examiner*—Martin P. Schwadron
*Assistant Examiner*—A. M. Zupcic
*Attorney*—William N. Antonis and Plante, Hartz, Smith & Thompson

[57] ABSTRACT

A power braking system having a vacuum operated pumping device for supplying fluid under pressure to operate a spring braking device. The pumping device has a housing with an internal cavity divided by a wall member. Vacuum is maintained on one side of the wall member while vacuum and atmospheric pressure are alternately communicated to the other side. This alternate communication will create a pressure differential across the wall member causing the wall member to reciprocate in the cavity. A cylinder having an inlet connected to a reservoir and an outlet operatively connected to the spring braking device contains a piston attached to the wall member. As the wall member reciprocates, the piston will pressurize the fluid transmitted to the outlet. A check valve located in the conduit leading from the outlet will prevent any backflow pressure while permitting the pumping device to raise the pressure in an accumulator to a predetermined value. When this predetermined pressure in the accumulator is equal to the force required to move the piston, alternate communication of vacuum and atmospheric pressure to the rear will automatically cease. An inversion valve has an inlet connected to the accumulator for communicating fluid under pressure through a control port to operate the spring brake device. Upon actuation of the inversion valve by an operator, fluid flow through the inlet is inhibited and the pressurized fluid allowed to escape to the reservoir to thereby permit the spring brakes to be applied. A pressure indicator located in the conduit between the check valve and the inversion valve will transmit a signal to an indicator to alert the operator if a low pressure condition is present in this braking system.

6 Claims, 3 Drawing Figures

PATENTED NOV 21 1972 3,703,077
SHEET 2 OF 2

INVENTOR
MAXWELL L. CRIPE
BY
Plante, Hartz, Smith & Thompson
ATTORNEYS

VACUUM PUMPING DEVICE

BACKGROUND OF THE INVENTION

Spring brakes have been proposed as one part of the dual braking system requirement in accordance with the Federal Highway's Safety Laws. Initially, the spring brake was operated by an inversion valve connected to the same source of pressurized fluid used to operate the entire braking system. If, for some reason the source of pressurized fluid was lost, the spring brakes were automatically applied, as disclosed in copending U.S. Pat. application Ser. No. 797,530 filed Feb. 7, 1969 now U.S. Pat. No. 3,599,761 owned by the same assignee and incorporated by reference. Later, as disclosed in copending U.S. Pat. application Ser. No. 28,843 filed Apr. 15, 1970 now U.S. Pat. 3,677,097 owned by the same assignee and incorporated by reference, a split full power system having an inversion valve capable of being modulated was developed to control the actuation of the spring brakes. In these split systems a pump driven by the crankshaft supplied the fluid under pressure to operate the spring brakes. Unfortunately, in modern automobiles the equipment driven by the crankshaft is ever increasing, i.e., air conditioning, power steering, fuel pump etc., with a resulting smaller crankshaft power output. In addition, the available power output has been further reduced partially by the use of unleaded gas to reduce pollution and the available engine space under the hood.

SUMMARY OF THE INVENTION

It has been observed that as long as internal combustion engines are running, vacuum will be produced at the intake manifold. The intensity of the vacuum will normally be the greatest when the accelerator pedal is released, as during periods of braking. This is because the intake air to the carburetor is restricted while the piston displacement is constant.

In order to conserve crankshaft power, I have devised a braking system powered by a vacuum pump for supplying high pressure fluid to operate the auxiliary spring brakes. The vacuum pumping device has a housing whose interior is divided by a diaphragm. A pressurizing piston is secured to a push rod which extends through and is attached to the diaphragm to operate a control valve. One side of the diaphragm of the pumping device is maintained under a vacuum while vacuum and atmospheric pressure are alternately communicated to the other side of the diaphragm by the control valve. Through this alternate communication a pressure differential will be created across the diaphragm which will cause the piston to reciprocate. The piston will automatically reciprocate to pressurize fluid communicated by a conduit to an accumulator until the force required to move the piston is equal to the force created by the pressure differential across the diaphragm. A check valve in the conduit will prevent backflow of the fluid transmitted to the accumulator. The control valve responsive to the movement of the diaphragm will transmit vacuum to both sides of the diaphragm at the bottom of the power stroke. A spring acting on the diaphragm then can move the piston to the beginning of the power position where the control valve will transmit atmospheric pressure to create the operational pressure differential. A manually operated inversion valve has an inlet attached to the accumulator which normally permits fluid pressure to pass to the spring brakes through a control port. When an operator desires to activate the spring brakes, the inversion valve is moved to inhibit the flow of fluid from the inlet while permitting fluid flow from the control port through an outlet to a reservoir operatively connected to the inlet port of the pumping piston. In the event that a low pressure exists in the conduit between the check valve and the inversion valve, a signal will be transmitted to an indicator to alert the operator of this condition.

It is therefore an object of this invention to provide a power braking system with a vacuum pumping means for operating a spring brake means.

It is another object of this invention to provide an auxiliary braking system with operational means without utilizing the power created by the crankshaft.

It is still a further object of my invention to provide an auxiliary braking system with means to assure a constant source of high pressure to operate a spring brake means.

These and other objects of my invention will become apparent from reading the specification and viewing the drawing.

DETAILED DESCRIPTION OF THE PREFERRED EMBODIMENT

Figure 1:
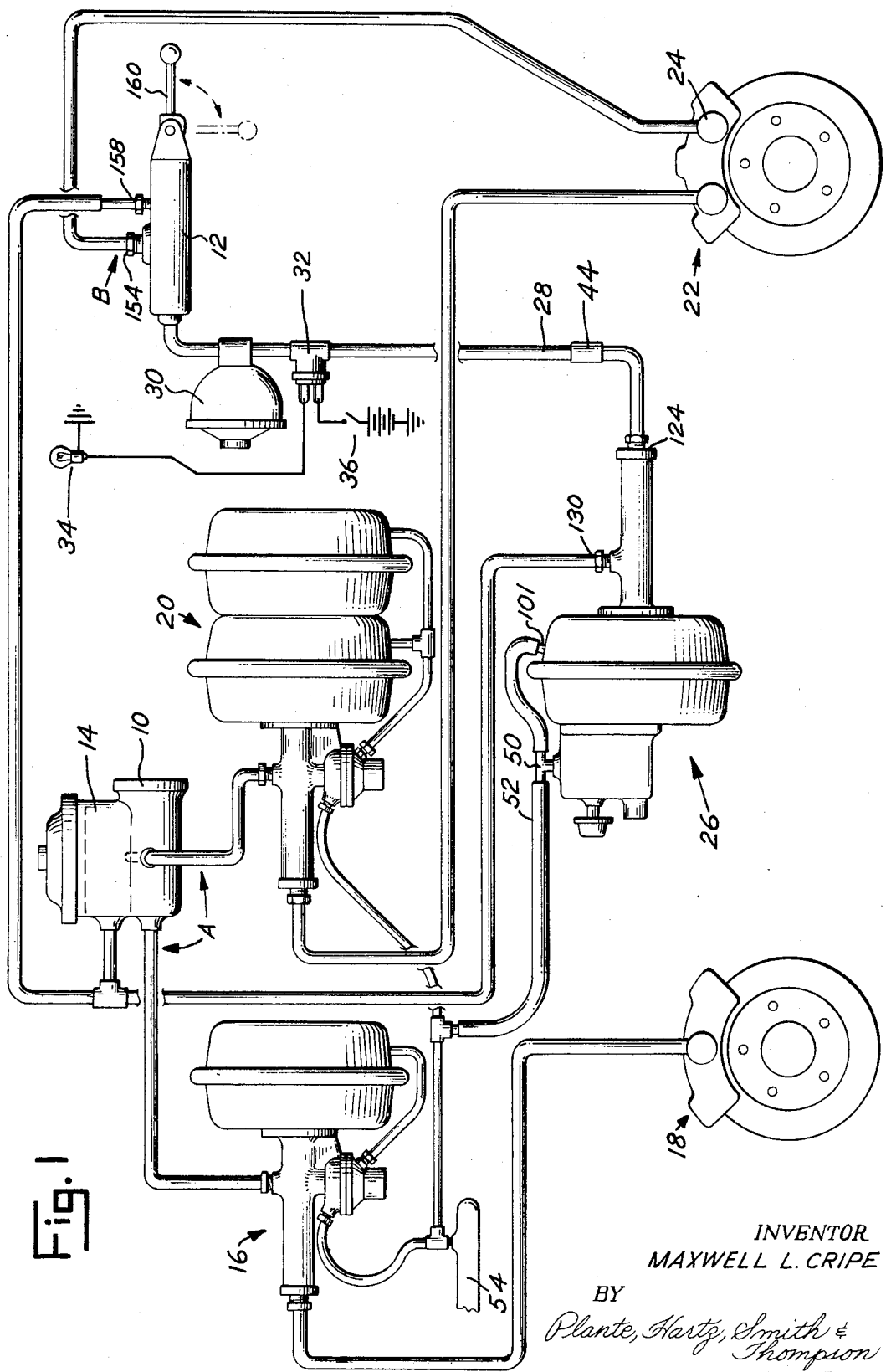
FIG. 1 is a schematic illustration of a dual full power system utilizing a vacuum pumping device for supplying fluid under pressure to an inversion valve for operatively controlling a parking and emergency spring brake means.

In FIG. 1 there is represented a dual full power braking system with the main system A being responsive to the split master cylinder 10 and the auxiliary system B being responsive to the inversion valve 12. Each system is operated independently of the other even though a common reservoir 14 in the master cylinder 10 is used to supply the same type of fluid to both systems.

In the main braking system A, in response to the application of a brake pedal (not shown) a piston (not shown) in the split master cylinder 10 will simultaneously transmit a pressure signal to the front power brake servomotor 16, of a type which operates in a manner fully described in U.S. Pat. No. 3,108,615 owned by the common assignee of the application and incorporated herein by reference, to operate the front service brakes 18 (only one of which is shown) and to the rear tandem power brake servomotor 20, which operates in the same manner as the front power brake servomotor 16, for operating the rear service brake 22,(only one of which is shown) in a manner fully described in copending U.S. Pat. application Ser. No. 797,530 now U.S. Pat. No. 3,599,761 incorporated herein by reference.

In the braking auxiliary system B used for emergency and parking an inversion valve 12, of a type disclosed in copending U.S. Pat. application Ser. No. 28,843 incorporated by reference above, controls fluid pressure being supplied to a spring brake 24 operating in a manner fully described in U.S. Pat. application Ser. No. 797,530 now U.S. Pat. No. 3,599,761. A vacuum pumping device 26, operatively connected by conduit 28 to accumulator 30 will pressurize fluid received from reservoir 14. Through the accumulator 30 the fluid pressure acting on the spring brake 24 will be maintained within relatively constant range. A switch 32, of a type fully described in U.S. Pat. application Ser. No. 784,775 filed Dec. 18, 1968, owned by the same common assignee of this application and incorporated herein by reference, is located in conduit 28 adjacent the accumulator 30. Switch 32 has an internal movable shaft (not shown) which is responsive to the fluid pressure in the conduit. If a low pressure is present in the conduit 28, the shaft will move to close an electrical contact switch which will cause an indicator device 34, either a warning light (as shown), which flashes or an audible signal (not shown), to be energized for alerting an operator of this low pressure condition.

Figure 2:
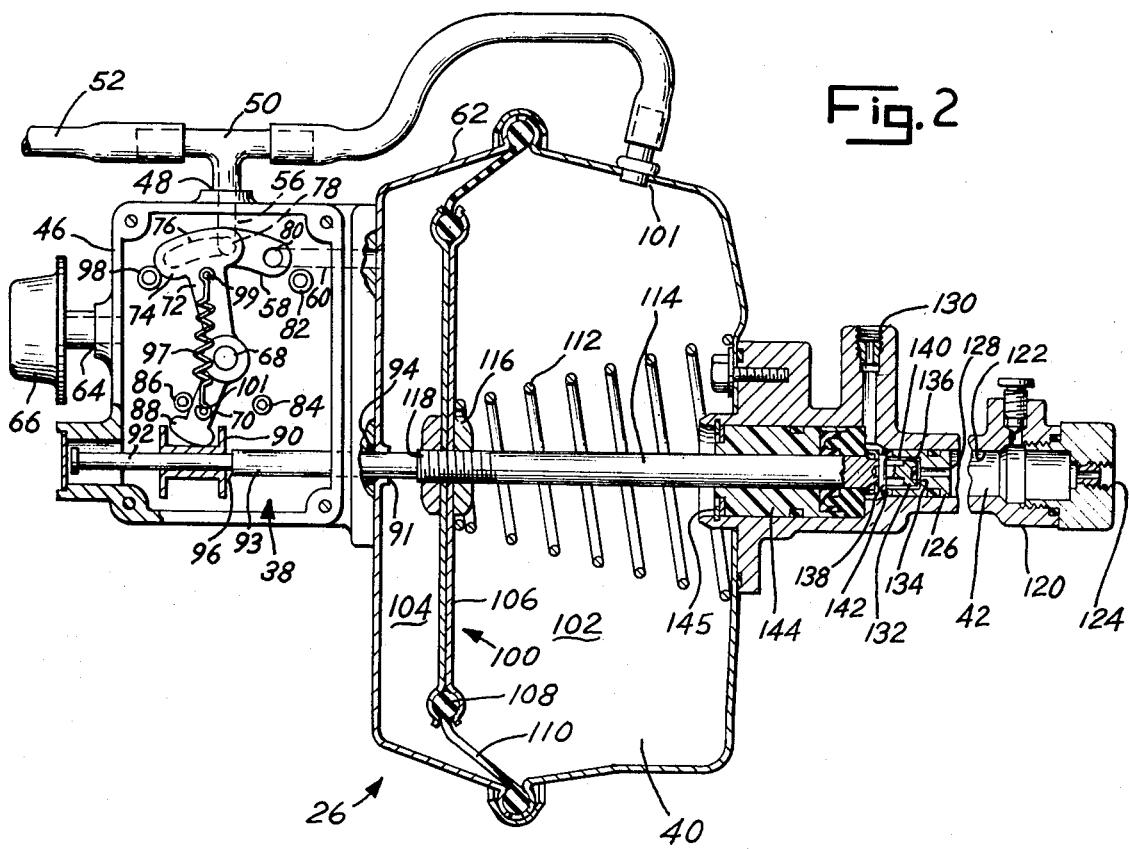
FIG. 2 is a cross sectional view of the vacuum pumping device which supplies the pressurizing force of the fluid of the system in FIG. 1.

In more particular detail, as shown in FIG. 2, the vacuum pumping device 26 consists of a control chamber 38, a power transmitting chamber 40 and fluid intensifying chamber 42 having a check valve 44 shown in FIG. 1 located in the conduit 28 leading to the accumulator 30.

The control section 38 has a housing 46 which has a first inlet port 48 connected to a tee connection 50 of conduit 52 leading to an intake manifold 54 of an engine which is the source of vacuum. Vacuum received from the source 54 at inlet port 48 is carried by internal passage 56 to an elevated arcuate land 58. A passageway 60 through land 58 connects the control chamber 38 with the rear of housing 62 of the power transmitting chamber 40. A second inlet port 64 permits atmospheric pressure to be transmitted through an air filter 66 to the control chamber 38. A pivot pin 68 is located at the intersection of perpendicular lines drawn to the tangent of a circle going through the center of the arcuate land 58. A first lever arm 70 and a second lever arm 72 are located on pivot pin 68. Second lever arm 72 has an arcuate shaped head 74 with an internal groove 76 of sufficient length to permit communication from inlet 78 of the vacuum communication to control outlet 80 connected to conduit 60 when lever arm 72 is against stop 82. First lever arm 70 whose pivotal movement is limited between stops 84 and 86 has a T-shaped end 88 which is retained in spool 90. Spool 90 is carried on a small diameter portion 92 of a control rod 93 which is sealingly retained and extends through opening 91 of housing 62 by seal 94. When spool 90 abuts shoulder 96 of control rod 93, the first lever arm 70 is brought against stop 86. A spring 97 attached to first and second lever arms 70 and 72, respectively by pins 99, will correspondingly move lever arm 72 against stop 98.

The power transmitting chamber 40 has a housing 62 with an internal cavity. The cavity is divided by a wall or diaphragm member 100 into a front chamber 102 and a rear chamber 104. The diaphragm member 100 has a stiff internal two-piece plate 106 which clamps together for holding the bead 108 of the flexible port 110 of the wall or diaphragm member 100. A resilient member 112 is concentrically located on plate 106 to surround a push rod 114 attached to the plate 106. A pair of nuts 116 are threaded on push rod 114 in a manner to hold plate 106 together. The push rod 114 has an internal threaded bore 118 to which control rod 93 is attached, in order to accurately position the spool 90 and first lever arm 70 against stops 84 and 86 during operation. The push rod 114 extends into the intensifying chamber 42 to transmit any force created across the diaphragm member 100 thereinto.

The fluid intensifying chamber 42 has a cylindrical body 120 with an axially extending chamber 122 from which fluid is forced through outlet 124 by displacement piston 126 attached to push rod 114. To replace the loss of fluid in chamber 122 upon piston 126 moving (to the right as viewed in FIG. 2) to transmit pressurized fluid to the accumulator 30, a compensating port 128 is connected to inlet port 130 in communication with reservoir 14. The change in volume of fluid in chamber 122 occurs because check valve 44 prevents the backflow of fluid as the piston returns to the left, as viewed in FIG. 2. During power activation, the compensation port 128 is closed by a poppet member 132 retained in an enlarged section 136 of the port by seating on shoulder 134. The push rod 114 to which poppet member 132 is attached, projects into the enlarged section 136 and is loosely fastened to the piston 126 by cross pin 138. The cross pin 138 is fixed to the push rod but moves in a slotted section 140 on the piston member 126. The length of the slotted section 140 is designed to permit the poppet member 132 to be unseated when the pin engages the rear end of the slot and seated on shoulder 134 at the front end of the slot. The cross pin is prevented from coming loose by a snap ring 142 positioned in a groove on the outer surface of the piston 132 overlying the ends of cross pin 138. A guide bearing 144, retained by a snap ring 145, maintains push rod 114 in alignment with the intensifying chamber and prevents any fluid from entering into the front chamber 102.

MODE OF OPERATION OF THE PREFERRED EMBODIMENT

After turning on ignition switch 36 shown in FIG. 1, if low pressure exists in the accumulator 30 and it is insufficient to release the spring brakes, a signal will be indicated through light 34. This will alert the operator not to try to attempt to move the vehicle until the fluid pressure in accumulator 30 is raised to release the spring brakes 24.

When the engine of the vehicle is started, vacuum will be created at the manifold 54. This vacuum will be transmitted through conduit 52 to the vacuum pumping device 26 through inlet port 101 in housing 62 where chamber 102 will be evacuated. In the rest position, outlet port 80 will communicate atmospheric pressure to the rear chamber 104. With vacuum in front chamber 102 and atmospheric pressure in rear chamber 104, a pressure differential will be created across wall diaphragm member 100. This pressure differential acting on wall or diaphragm member 100 will create a force which will move push rod 114, closing compensating port 128 and will pressurize the fluid in chamber 122 passing through outlet port 124. At the bottom of the stroke of piston 126, the diaphragm will have compressed resilient member 112 and will have moved the first lever arm 70 carried by the spool 90 to the right as viewed in FIG. 2 against stop 84. In this position, pin 101 which formed a triangle with pin 99 and pivot point 68 having spring 97 as the base (as shown in FIG. 2), will have moved past the apex of the triangle causing the base (spring 97) to be located on the opposite side of the pivot point 68. The spring 97 will cause the second lever arm 72 to pivot around point 68 into abutment with stop 82. Vacuum will be transmitted by groove 76 from inlet port 78 through outlet port 80 to the rear chamber 104. With vacuum in both chambers 102 and 104, the resilient member 112 will now urge the diaphragm member 100 toward the rear chamber 104 and return the piston 126 to the up stroke position. As the piston 126 is being returned, compensating port 128 is opened replacing the pressurized fluid transmitted to the accumulator 30. When the diaphragm member 100 is fully returned to the left, as viewed in FIG. 2, the first lever arm 70 is moved to abut stop 86 where spring 97 will pull the second lever arm 72 to abut stop 98. With the second lever arm 72 abutting stop 98, atmospheric pressure is again communicated to the rear chamber 104 causing a pressure differential across wall or diaphragm member 100. The above cycle is repeated until the force required to move the piston by the diaphragm is greater than the pressure differential which can be created by the vacuum and atmosphere acting across the wall or diaphragm member 100. At this point, the pressure in the accumulator 30 will have reached a predetermined value sufficient to interrupt the signal to indicator 34 and permit the spring brakes to be released in response to the operator controlled inversion valve 12.

Figure 3:
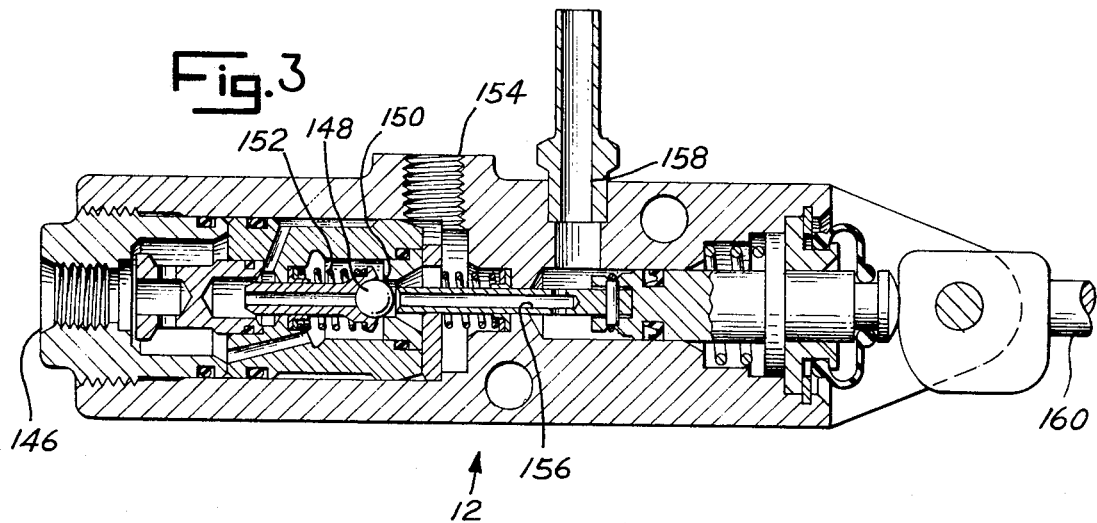
FIG. 3 is a cross sectional view of the inversion valve which controls the application of the spring brakes in FIG. 1.

As shown in FIG. 3, inversion valve 12 is in the position with the spring brakes 24 applied. In the applied position, fluid communication from inlet port 146 connected to the accumulator 30 is inhibited by ball 148 being urged against seat 150 by spring 152. Any fluid pressure acting on the spring brakes 24 can now escape through control port 154 through activation stem 156 and out the outlet port 158 to the reservoir 14.

When sufficient fluid pressure has been stored in the accumulator 30, upon moving the activation stem 156, by positioning the manual lever means 160 to the dashed location as shown in FIG. 1, the ball valve 148 will be unseated. With the activation stem 156 seated on ball valve 148, pressurized fluid flow will pass between the stem 156 and the seat 150 to be communicated through control port 154 to release the spring brake means 24.

In the event that a malfunction should occur in the system with fluid being lost or unavailable at inlet port 130, the vacuum pumping device 26 would continue to operate but would not change the pressure in the accumulator 30. By designing the size of the accumulator to permit from two to five manual applications of the spring brakes 24 would permit the operator to move a vehicle from the roadway to a shoulder and out of the immediate line of traffic. When the fluid in the accumulator is depleated, the spring brakes will be automatically applied. This will prevent movement of the vehicle until the spring brakes are released by fluid pressure or through manual means of a type disclosed in U.S. Pat. application Ser. No. 38,088 filed May 18, 1970 now U.S. Pat. No. 3,647,030 owned by the same assignee of this application and incorporated herein by reference. Thus, I have devised a braking system which will operate independently of the crankshaft power produced to effectively produce sufficient energy to maintain an emergency or parking brake system.

I claim:

1. A power braking system having a fluid operated spring brake means for use as an emergency and parking brake in response to a manually positioned control valve directing fluid under pressure supplied by a differential pressure powered pumping means to control the operation of said spring brake means, said pumping means comprising:

a housing having an internal cavity;

wall means dividing said cavity into a front chamber and a rear chamber, said front chamber being operatively connected to a source of vacuum;

a cylinder having an inlet port and an outlet port, said inlet port being connected to a reservoir containing said fluid, said outlet port being connected by a conduit to said spring brake means;

check valve means located adjacent said outlet port for preventing fluid under a backflow force from the spring brake means entering said cylinder;

piston means located in said cylinder having a compensating port connected to said inlet port; push rods having at one end a compensating valve slidable in said piston for cooperation with said compensation port by means of a cross pin and slot, said cross pin also connecting said push rod to said piston for relative motion therebetween through a second slot in the piston, and the other end of said push rod being connected to said wall means;

resilient means located in said front chamber for urging said wall means toward said rear chamber to open said compensating valve and permit fluid from the inlet port to enter said cylinder;

control means having a second housing having a first inlet connected to said source of vacuum, a second inlet connected to the atmosphere, and an outlet connected to said rear chamber;

control rod means axially aligned with and secured to said push rod means, said control rod means extending through said rear chamber into said second housing, said control rod having a small diameter section located thereon;

spool means slidably carried on said small diameter portion of said control rod means;

a pivot pin secured to said second housing;

a first lever arm pivotally attached to said pin and connected to said spool means;

a second lever arm pivotally attached to said pivot pin, said second lever arm having a groove which overlays said first inlet; and a spring attached to said first and second lever arms for moving said second lever arm in response to corresponding movement of said first lever arm as said spool means moves on said small diameter portion for alternately permitting communication of vacuum and atmospheric pressure to said rear chamber creating a pressure differential across said wall means causing said piston means to reciprocate in said cylinder and pressurize the fluid admitted from said inlet port by being forced through said outlet port, said piston means will continue to reciprocate until the force required to move said piston means against said backflow force present at said check valve is equal to the force created by the pressure differential across said wall means.

2. The power braking system, as recited in claim 1 wherein said second lever arm seals the first inlet port until the pressure differential across said wall means has moved the spool means a sufficient distance to position the spring on said first lever arm at a location on the opposite side of said pivot pin to cause said second lever arm to pivot on said pin, said spring urging said second lever arm into abutment with a stop where vacuum is communicated through said groove to said rear chamber.

3. The power braking system, as recited in claim 2 wherein vacuum is communicated to said rear chamber to eliminate the pressure differential across said wall means, said resilient means in the absence of a pressure differential across said wall means moving said movable wall means toward said rear chamber until said spring on the first lever arm has moved to a location on the opposite side of the pivot point a sufficient distance to cause said second lever arm to pivot on said pin, said pivotal movement by said second lever will open said outlet port and permit atmospheric pressure to said rear chamber.

4. The power braking system, as recited in claim 3 further including:

means operatively connected to the conduit, located between said means for preventing backflow and said spring brake means, for transmitting a signal to an indicator device to alert an operator that a low fluid pressure exists in the system.

5. The power braking system, as recited in claim 4 further including:

means operatively connected to the conduit, located between said means for preventing backflow and said spring brake means, for storing a supply of fluid under pressure sufficient to permit a series of spring brake releases when vacuum for powering said pumping means is unavailable.

6. The power braking system, as recited in claim 5, manually positioned control valve includes a housing having an inlet port connected to said means for storing a supply of fluid under pressure, an outlet port connected to said reservoir and a control port connected to said spring brake means, said valve means having actuator means responsive to an operator for releasing the force of the fluid under pressure normally communicated to said spring valve means from said inlet port through said control port by inhibiting fluid flow through said inlet port and allowing the fluid under pressure acting on said spring brake means to escape from said control port through said outlet port and thereby permit said spring brake means to be released.

* * * * *